United States Patent
Blot et al.

(10) Patent No.: US 7,289,117 B2
(45) Date of Patent: Oct. 30, 2007

(54) PROCESS FOR PROVIDING A VECTOR IMAGE WITH REMOVED HIDDEN LINES

(75) Inventors: Andre Blot, Viroflay (FR); Alain Deleglise, Meudon (FR)

(73) Assignee: Dassault Systemes (FR)

( * ) Notice: Subject to any disclaimer, the term of this patent is extended or adjusted under 35 U.S.C. 154(b) by 265 days.

(21) Appl. No.: 10/898,503

(22) Filed: Jul. 23, 2004

(65) Prior Publication Data
US 2005/0041022 A1 Feb. 24, 2005

(30) Foreign Application Priority Data
Jul. 28, 2003 (EP) ................. 03291861

(51) Int. Cl.
*G06T 15/40* (2006.01)
(52) U.S. Cl. ................. 345/421
(58) Field of Classification Search ............... 345/421
See application file for complete search history.

(56) References Cited

U.S. PATENT DOCUMENTS

| | | | |
|---|---|---|---|
| 4,918,626 A * | 4/1990 | Watkins et al. | 345/421 |
| 4,924,414 A * | 5/1990 | Ueda | 345/422 |
| 5,220,646 A * | 6/1993 | Fossum | 345/422 |
| 5,265,214 A * | 11/1993 | Nitta | 345/422 |
| 5,359,704 A * | 10/1994 | Rossignac et al. | 345/422 |
| 5,864,342 A * | 1/1999 | Kajiya et al. | 345/418 |
| 6,801,215 B1 * | 10/2004 | Silva et al. | 345/629 |
| 2005/0052455 A1 * | 3/2005 | Long et al. | 345/422 |

OTHER PUBLICATIONS

Alevizos, P.D., "A linear algorithm for labeling planar projections of polyhedra", Proc. IROS '91 IEEE/RSJ Int'l Workshop onIntelligent Robots and Systems '91, Intelligence for Mechanical Systems, pp. 595-601, vol. 2.*

Dey, T. K. and Hudson, J., "PMR: point to mesh rendering, a feature-based approach", Proceedings of the Conference on Visualization '02, Visualization, IEEE Computer Society, Washington, DC, pp. 155-162.*

Willimas, L., "3D paint", Proceedings of the 1990 Symposium on interactive 3D Graphics, SI3D '90, ACM Press, New York, NY, pp. 225-233.*

Dunnett, G.J.; White, M.; Lister, P.F.; Grimsdale, R.L.; Gelmot, F., "The Image chip for high performance 3D rendering", IEEE Computer Graphics and Applications, vol. 12, Issue 6, Nov. 1992 pp. 41-52.*

(Continued)

Primary Examiner—Ulka Chauhan
Assistant Examiner—Roberta Prendergast
(74) Attorney, Agent, or Firm—Victor Siber, Esq.; Clifford Chance US LLP

(57) ABSTRACT

For computing a vector image of a view of a modeled object with removed hidden lines, a bitmap image of the modeled object, with removed hidden lines is first computed (22) in a graphic card. For each line of the modeled object, a raster of the line in the same view is computed (26). The pixels of the raster are compared (30) with corresponding pixels of the bitmap image, to determine whether there exists in the bitmap image pixels corresponding to the pixels of the raster. According to the results of the comparison, the visible parts of the line are determined (38).

13 Claims, 5 Drawing Sheets

OTHER PUBLICATIONS

Lum et al., "Texture hardware assisted rendering of time-varying volume data", Proceedings of the Conference on Visualization '01, Oct. 21-26, 2001, IEEE Computer Society, Washington, DC, pp. 263-270.*

Wylie et al., "Tetrahedral projection using vertex shaders", Proceedings of the 2002 IEEE Symposium on Volume Visualization and Graphics, Oct. 28-29, 2002, IEEE Press, Piscataway, NJ, pp. 7-12.*

Moreton, H., "Watertight tessellation using forward differencing", Proceedings of the ACM SIGGRAPH/EUROGRAPHICS Workshop on Graphics Hardware, Aug. 2001, ACM Press, New York, NY, pp. 25-32.*

European Search Report for EP 03291861 dated Feb. 3, 2004.

J.D. Foley et al., "Visible-Surface Determination," Computer Graphics—Principles and Practice—$2^{nd}$ Edition, 1990, chapter 15, pp. 649-720.

Jan Fischer et al., "Detecting Dynamic Occlusion in Front of Static Backgrounds for AR Scenes," Proceedings $9^{th}$ Eurographics Workshop on Virtual Environment and $7^{th}$ International Workshop on Immersive Projection Technologies, May 23, 2003, pp. 153-161.

Anonymous, "CATIA Version 5 Release 6 Solutions Application Portfolio," online, May 3, 2001. <URL:http://web.archive.org/web/20030902011224/http:www.3.ib.com/solutions/engineer>. Retrieved on Sep. 16, 2003.

S. Roth et al., "CATIA-Applikation MESSEN," Werkstattstechnik, Springer Vertag, Berlin, Germany, Sep. 1, 1992, vol. 82, No. 9.

* cited by examiner

PROCESS FOR PROVIDING A VECTOR IMAGE WITH REMOVED HIDDEN LINES

CROSS REFERENCE TO RELATED APPLICATIONS

This application claims priority to European patent application no. 03291861.7 filed Jul. 28, 2003.

BACKGROUND OF THE INVENTION

The invention relates to the field of computers programs and systems, and more specifically to part design programs and systems.

DESCRIPTION OF RELATED ART

A number of systems and programs are offered on the market for the design of parts or assemblies of parts, such as the one provided by the applicant under the trademark CATIA. These so-called computer-aided design (CAD) systems allow a user to construct and manipulate complex three-dimensional (3D) models of parts or assembly of parts. A number of different modelling techniques can be used to create a model of an assembly. These techniques include solid modelling, wire-frame modelling, and surface modelling. Solid modelling techniques provide for topological 3D models, where the 3D model is a collection of interconnected edges and faces, for example. Geometrically, a 3D solid model is a collection of trimmed or relimited surfaces that defines a closed skin. The trimmed surfaces correspond to the topological faces bounded by the edges. The closed skin defines a bounded region of 3D space filled with the part's material. Wire-frame modelling techniques, on the other hand, can be used to represent a model as a collection of simple 3D lines, whereas surface modelling can be used to represent a model as a collection of exterior surfaces. CAD systems may combine these, and other, modelling techniques, such as parametric modelling techniques. CAD systems thus provide a representation of modelled objects using edges or lines, in certain cases with faces. Lines or edges may be represented in various manners, e.g. non-uniform rational B-splines (NURBS).

One function usually required by users of CAD systems is the ability to produce images. of the modelled objects, e.g. for production drawings or the like. In such images, the modelled object is represented by a set of lines, which generally correspond to the edges and silhouettes of the modelled object; silhouettes are virtual lines, as explained below. It may be of use to remove hidden lines, that is, remove from the image the representation of the lines of the object which would not be seen by a user if the real object were to be viewed. This function, as well as definitions of elements of a CAD system, is exemplified in reference to FIGS. 1-3.

FIG. 1 shows a wire frame view of an object formed of a parallelepiped basis 2 with a cylinder 4 on the upper surface of the basis. The basis is formed of six faces; each face is a relimitation of a surface which is an infinite plane. The cylinder can be seen as having three faces: the upper and lower faces are disks. The disks are relimitations of infinite planes. The lateral face of the cylinder is its cylindrical wall. The cylindrical wall is a relimitation of an infinite surface forming a tube. This surface is bound or relimited by two circles. In a tessellated representation, the object would be represented by a set of facets; facets are polygons, usually triangles. In the proposed example, the lateral faces and the lower face of the basis could each be represented by two triangles; the upper face of the basis 2, outside of the lower disk of cylinder 4, the lateral and upper faces of the cylinder could be represented by a higher number of faces. The word "edge" designates a topological boundary of a face; the word "wire" designates a monoparametric element. The word "silhouette" (or outline) is a virtual monoparametric element, as exemplified below. In the rest of the description, the word "line" encompasses edges, wires, silhouettes or any other monoparametric curve.

In the example of FIG. 1, the lines representing the edges of basis 2 as well as the edges of cylinder 4 are represented. FIG. 1 further shows two vertical lines 6 and 8, which represent the boundaries of the cylinder. These lines are actually not edges of the modelled object, but still appear on the image; they are virtual lines or silhouettes, since they actually depend on the view. In the wire frame view of FIG. 1, all lines of the modelled object are represented. These lines include those edges or part of edges that would normally be hidden.

FIG. 2 shows a view of the modelled object of FIG. 1, where hidden lines are removed; in FIG. 2, these hidden lines are simply not represented. For instance, line 10 of basis 2 is interrupted around its middle, at the part hidden from the viewer by cylinder 4. Points 14 and 16 show the intersection of line 10 with vertical lines 6 and 8: line 10 is hidden between points 14 and 16. Line 12 in FIG. 2 is filly visible, since it is the front bottom line of the basis 4.

FIG. 3 shows a view of the modelled object of FIG. 1, where hidden lines are removed; in FIG. 3, these hidden lines are represented in broken lines. For instance, line 10 of basis 2 is represented in broken lines around its middle. For the draftsman, both FIGS. 2 and 3 show a view with removed hidden lines. One could also select other graphic representations for hidden lines, e.g. different colours and the like. Removal of hidden lines in this specification covers all examples where the representation of the lines or edges changes, according to their being hidden or visible on the relevant view. Even though the representation of FIG. 1 is a perspective view, the same problem of removing hidden lines appears for other types of view, such as top or side views.

Images of a modelled object may be of different types. Bitmap images are notably used for the purpose of displaying the images to the end user on a computer screen. The computer screen is a two-dimensional matrix of pixels and a bitmap image is a two-dimensional matrix of values; these values may be binary values for a black and white display, or may be more elaborate values, e.g. for colour displays. A bitmap image is thus a set of values, which represent colour values for different pixels of the image. Vector images are formed of lines or curves and not simply pixel elements; these are notably useful for tracing machines and for various computer software programs. A vector image is thus represented by a series of lines. For instance, a bitmap image of the view of FIG. 1 would comprise a number of pixels for representing the various lines. A vector image of the view of FIG. 1 could comprise 14 lines and 2 circles; alternatively, the circles could be defined as a number of straight segments. The person skilled in the art understands that the type of representation of the lines used in a vector images may vary according to the image format.

Solutions for removing hidden lines are known. One algorithm known as the "painter algorithm" uses as a starting basis a tessellated representation of the modelled object, that is, a representation of the modelled object as a set of edges and facets. The algorithm consists in successively drawing in the image each of the edges and facets. At the time a pixel of an edge or facet is drawn, the algorithm checks whether this pixel appears in the view in front or back of pixels already drawn on the image. In the latter case, the pixel is not drawn. In the former case, it replaces the existing pixel in the image. The algorithm makes it necessary to store, for each pixel drawn on the image, a depth value representative of the depth of the pixel in the view. The algorithm provides a bitmap image of the modelled object, where hidden lines are removed. A by-product of this algorithm is a depth image, in which there is stored, for each drawn pixel of the image, a value representative of its depth in the view. This algorithm is for instance disclosed in *OpenGL Programming Guide*, Third Edition Addison Wesley. The algorithm responds rapidly, but is only adapted to provide a pixel image.

In the design system sold under the trademark CATIA, there is provided a program for providing a vector image of a modelled object. This program operates by determining, for each edge in a representation of the modelled object, whether this edge is hidden by another edge or a facet of the modelled object. This program is satisfactory; however, for complex images, it may require a computing time important enough to be sensible to the user of the design system.

A solution for removing hidden lines from an image is known under the word "shading"; a specific type of shading is a "dynamic hidden line remover". Shading is disclosed in *OpenGL Programming Guide*, Third Edition, Addison Wesley, pp. 584 et seq. A dynamic hidden line remover is used in CATIA V5. This last solution consists in changing the colours of facets in a tessellated representation of a modelled object. The colour of facets is changed to background colour. The amended tessellated object is applied to a graphic card. The result is a bitmap image with hidden lines: indeed, facets do not appear to the user, since they have the same colour as the background. However, the facets are actually drawn in the graphic card, so that rear edges appear to be hidden. This solution is satisfactory, e.g. for displaying on a screen an image of the modelled object; however, it only provides a bitmap images.

Thus, there exists a need for a solution providing a vector image of a modelled object, with removed hidden lines. The solution should preferably be easily implemented and should not demand excessive CPU time or memory space, even for large modelled objects.

BRIEF SUMMARY OF THE INVENTION

According to the invention, there is provided a computer-implemented process for providing a vector image of a view of a modelled object with removed hidden lines, comprising the steps of:
providing a bitmap image of the view of the modelled object, with removed hidden lines;
for a line of the vector image,
  providing a raster of the line in the view,
  comparing pixels of the raster with pixels of the bitmap image and
  according to the results of the comparison, determining a visible part of the line.

In a preferred embodiment, the step of providing a bitmap image comprises computing a bitmap image in hardware logic, for example a bitmap image computed in a graphic card.

Preferably, the modelled object is provided in a tessellated representation with edges and faces, and the lines comprise edges and silhouette of the tessellated representation.

In another preferred embodiment, the lines of the modelled object are signed, and the step of providing a bitmap image further comprises signing pixels in the bitmap image. Advantageously, different lines are provided with different signatures.

Preferably, the process of the invention further comprises, for a line having a given signature, the steps of:
searching if the bitmap image comprises pixels having the given signature, and
if the bitmap image does not comprise pixels having the given signature, determining that the line is not visible in the vector image.

In a preferred embodiment, the step of comparing comprises comparing a signature of the line with a signature of pixels of the bitmap image and the lines of the modelled object are colour-signed.

In another preferred embodiment, the modelled object is provided in a tessellated representation with edges and facets and the step of determining comprises:
finding a facet hiding a line, and
computing the intersection of the facet with the line.

In another solution, the modelled object is provided in a tessellated representation with edges and facets and the step of determining comprises:
finding a facet hiding a line, and
computing the intersection of the line with a face related to the facet.

The invention also provides for a program for providing a vector image of a view of a modelled object with removed hidden lines, comprising
a routine for receiving a bitmap image of the view of the modelled object, with removed hidden lines;
a routine for providing a raster of a line of the modelled object in the view;
a routine for comparing pixels of the raster of a line with pixels of the bitmap image and
a routine for determining, according to the results provided by the comparing routine, a visible part of the line.

Preferably, the program is adapted to receive a tessellated representation of the modelled object, with edges and facets.

In a preferred embodiment, the program is adapted to receive a modelled object with signed lines and a bitmap image with signed pixels.

The program of the invention further comprises a routine for searching whether the bitmap image comprises pixels having the signature of a line of the modelled object.

Advantageously, the program is adapted to receive a modelled object with colour-signed lines and a bitmap image with colour-signed pixels.

In a preferred embodiment, the program is adapted to receive a modelled object in a tessellated representation with edges and facets and the determining routine is adapted to
find a facet hiding a line, and
compute the intersection of the facet with the line.

In another preferred embodiment, the program is adapted to receive a modelled object in a tessellated representation with edges and facets and the determining routine is adapted to
find a facet hiding a line, and
compute the intersection of the line with a face represented by the facet.

A computer-aided design system embodying the invention will now be described, by way of non-limiting example, and in reference to the accompanying drawings,

DETAILED DESCRIPTION OF THE INVENTION

Figure 1:
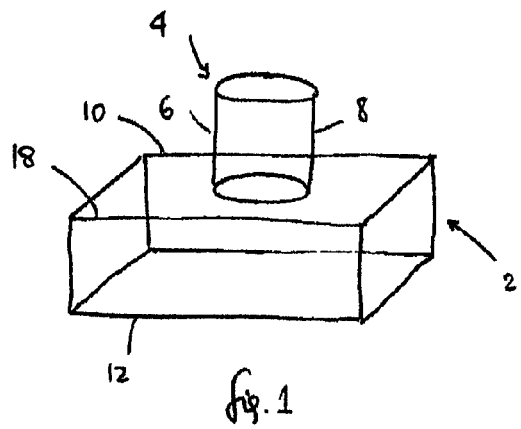
FIG. 1 is a schematic wire-frame representation of a modelled object.

The invention takes advantage of existing solutions for providing bitmap images of a modelled object, with removed hidden lines, such as those embodied in computer graphic cards. For providing a vector image of a view of the modelled object, the invention uses a bitmap image of the view of the modelled object; hidden lines are removed on the image.

For a given line of the modelled object—an edge in the example of a tessellated representation of the object—the invention suggests drawing a raster of the line in the same view. The raster is in fact a pixel representation of the line in the view. Providing the raster is tantamount to providing a bitmap image of a view of a modelled object solely comprised of the line. One may then compare the pixels in the raster and the corresponding pixels in the bitmap image. If a pixel of the raster is not comprised in the bitmap image, it means that the corresponding part of the line is hidden and should not appear in the vector image. The comparison thus makes it possible to determine the parts of the line which should be visible in the vector image—alternatively, the parts of the line which should be hidden in the vector image.

The process may be repeated for all lines in the vector images, in the simplest embodiment. Solutions for accelerating the process are discussed below.

The invention provides the following advantages. First, it has a complexity which is a linear function of the number of lines in the modelled object. This is to be compared to the prior art program discussed above, for which the complexity is a quadratic function of the number of lines, since each line has to be compared to all other lines and facets in the modelled object.

Second, the invention makes it possible to adapt the resolution, simply by changing the granularity of the bitmap image and of the raster. The choice of resolution may be global—with the same resolution for the whole image; different resolutions may also be used on the same image. One may thus provide very rapidly a rough vector image of the modelled object, with a coarse resolution.

Third, the resolution may be increased, to be even smaller than the pixel size in the bitmap image, as discussed below.

Fourth, the invention is robust. Under the assumption that the bitmap image is not erroneous, the upper limit of an error on a line in the vector image is the pixel size in the bitmap image. This means that the vector provided according to the invention is as reliable as the bitmap image. It is sound to assume that the bitmap image is not erroneous; thus, the vector image will not contain blatant errors—such as a full line which should have been hidden.

Other advantages of the invention are discussed in the following description. As stated above, the word "line" encompasses any type of edge, wire, curve, and silhouette or monoparametric element. Thus, the word "line" extends beyond the traditional designation of a straight line in the field of geometry.

The invention is described in the example of a tessellated representation of the modelled object, for the sake of explanation. The modelled object is thus represented by a set of edges and facets, which are respectively noted $E_i$ and $F_j$, indices i and j being integers. The person skilled in the art of design systems will understand that the invention may be applied to other representations of modelled objects.

Figure 4:
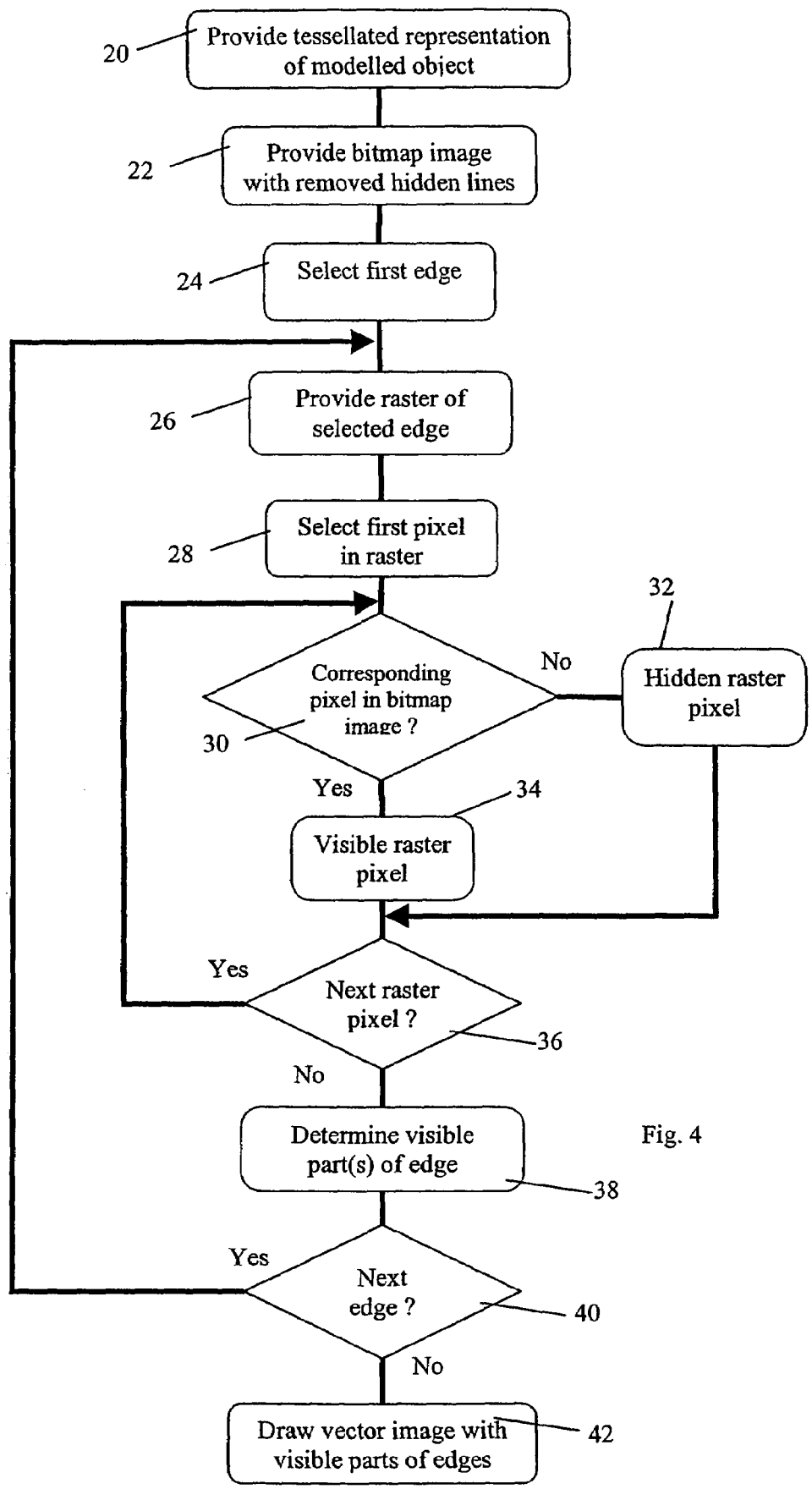
FIG. 4 is a flowchart of the process in a first embodiment of the invention.

FIG. 4 is a flowchart of the process in an embodiment of the invention.

In step 20, there is provided a tessellated representation of the modelled object. Methods for providing such a representation are not discussed here, as they are known to the person skilled in the art.

In next step 22, there is provided a bitmap image of the modelled object, with removed hidden lines. One may use in this step a software or hardware solution, or a mix of both. An exemplary hardware solution consists in using a graphic card and applying to the graphic card the modelled object; this solution has the advantage of being usable in any computer provided with a graphic card. In addition, it ensures that the step is carried out rapidly. The bitmap image may be the one used for display on a monitor; it could be a virtual image, of any size, which is not intended to be displayed. The image could be stored in a memory or generated on the fly.

Even if this hardware solution is currently preferred, one may also use other solutions, inasmuch they provide the required bitmap image. One understands, at this step, that the bitmap image is an image of the modelled object in a given view—such as in FIG. 1, a front perspective view.

In step 24, a first edge is selected. In the simplest embodiment of the invention discussed here, one may simply select the first edge E1 in the tessellated representation of the modelled object. As discussed below, it may be sufficient to consider a subset of edges of the modelled object; a linear scan of the edges is also not a requirement for carrying out the process.

Figure 2:
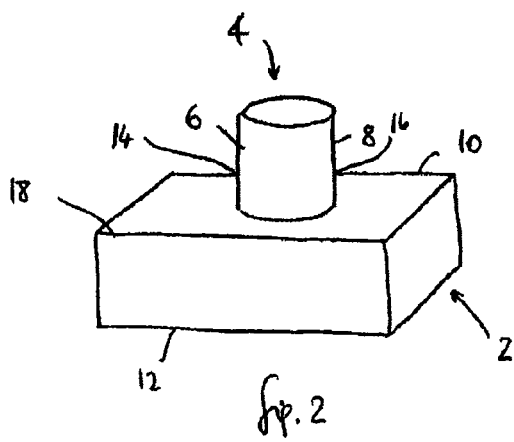
FIGS. 2 and 3 are views similar to the one of FIG. 1, where hidden lines are removed.
Figure 3:
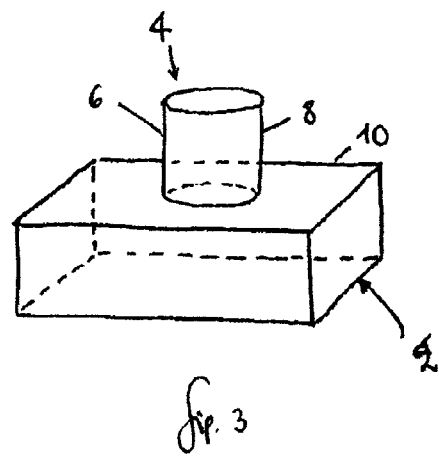

In step 26, there is provided a raster of the selected edge. As discussed above, a raster is a pixel representation of the edge, in a view that corresponds to the view selected for the bitmap image. For instance, if the view is a front perspective view at a given scale, one provides a raster of the edge in the same front perspective view, with the same scale. This has the effect that, if the edge is not hidden in the bitmap image, the raster will superimpose with the representation of the edge in the bitmap image. In the example of FIG. 2, the raster of edge 12 will superimpose with the pixels of edge 12 in the bitmap image. The raster of edge 10 will superimpose with the pixels of the bitmap image, but only in the visible part of the edge in the bitmap image.

There are several solutions for providing the raster. One may simply use a software algorithm for drawing the edge in the required view and then separate the drawn edge into pixels. One may also consider that the edge is actually a tessellated object, formed of a single edge; a bitmap image of this object provides the raster of the edge. Such a bitmap image may be obtained by any of the solutions discussed in reference to step 22.

In the simplest embodiment, the pixel size in the raster is the same as the pixel size in the bitmap image. This simplifies the comparison step discussed below and optimizes the resolution obtained in the vector image. However, the pixel size in the raster is not necessarily the same as the pixel size in the bitmap image. For instance, the selected edge may not require a high resolution in the vector image with hidden lines removed; in this case, one could decide that the resolution in the raster—the pixel size—is higher than the pixel size in the bitmap image.

At the end of step 26, there is provided a raster of the edge and a bitmap image with removed hidden lines. One may then, as discussed in the steps 28-36, compare the pixels of the raster to the pixels of the image to be able to determine which parts of the edges should be visible in the vector image. In the examples of edges 10 and 12 of FIG. 2, the comparison would provide the following results. For edge 12, there would exist in the bitmap image pixels corresponding to all pixels in the raster. This means that edge 12 should be fully visible in the vector image of the modelled object. As regards edge 10, there are no pixels in the bitmap image that correspond to the pixels around the centre of the raster; this means that the part of the edge 10 around the centre should not be visible.

In step 28, one considers the first pixel in the raster, e.g. a pixel corresponding to one end of the edge. In step 30, for the selected pixel, one searches in the bitmap image whether there exists a corresponding pixel. In the simplest embodiment, where the pixel size in the raster and in the bitmap image are the same, this may consist in searching in the bitmap image whether a pixel from an edge is drawn at the location of the pixel in the raster. If there is no corresponding pixel, the process passes to step 32, where it is determined that the raster pixel corresponds to a part of the edge which needs to be hidden in the vector image. Else, if there is a corresponding pixel, the process passes to step 34, where it is determined that the raster pixel corresponds to a part of the edge which should be visible in the vector image. If pixel size differs in the bitmap image and in the raster, step 30 is adapted accordingly.

After step 32 or 34, the process passes to step 36, in which a test is carried out to find the next raster pixel. If there is one, the process passes to 30 for this next pixel; else, the raster of the edge was fully scanned and the process passes to step 38.

In step 38, the comparison is over for the pixels of the raster of the selected edge. One may then determine, based on the results of the comparison, which parts of the selected edge should be visible in the vector image. One solution therefore is to search along the raster for transitions, that is, for pixels of the raster where there is a change in the comparison of step 30. The position of these pixels determines, on the edge, the ends of the visible or hidden parts of the edge. In the example of FIG. 2, edge 12 of basis 4 would be comprised of pixels with underlying bitmap pixels— steps 30 and 34 in FIG. 4. This leads to the conclusion that edge 12 should be fully visible in the vector image. Starting from the left end of edge 10 in FIG. 2, the pixels are first visible, up to the pixel corresponding to point 14; at this time, there is a transition, that is, the next pixels are not visible. There is a second transition at point 16, where pixels are again visible, up to the right end of edge 10 in FIG. 2.

Knowing the transition pixels, one may find the corresponding points on the edge, by an operation inverse of the one providing the raster. One may also use a table of correspondence between the pixels of the raster and the edge. One may thus determine the visible part(s) of the edge, based on the results of the comparison in steps 28-36.

In step 40, it is checked whether there is any remaining edge to be considered. If the answer is positive, the process passes to step 26; else, in step 42, the vector image is drawn with the visible part(s) of the edges. One could also draw the image edge by edge, that is proceed with step 42 before step 40; this avoids having to store the image with removed hidden line.

Objects of less than one pixel may be ignored in the image. Alternatively or in combination, in step 30 or 32, if no pixel is found, one may search in surrounding pixels. This is especially useful if the OpenGL standard is used, since an error of one pixel is authorized in this standard.

The advantages of the invention appear from the description of FIG. 4. As regards complexity, each edge is scanned once, and compared to the bitmap image and not to every other facet or edge. Resolution may be adapted; as discussed above, one may change the granularity of the bitmap image for determining the maximum resolution. One may also use a different granularity for the raster, e.g. in the areas of the image where high resolution is not needed.

FIG. 4 is but an example of the invention. As discussed, there is no requirement to proceed with a linear scan of all edges: the order in which the edges are processed does not impact the resulting view; one may also skip some of the edges, as exemplified above. Similarly, in comparison steps 28-36, an edge is scanned from one end to the other; one could proceed with parallel comparison of several pixels; one could also scan first only a subset of pixels distributed over the edge and then look for transitions with a finer step. The solution adopted depends on the required resolution. Elaborate solutions may be faster. In the process of FIG. 4, the test in step 30 only tests whether there exists a pixel in the bitmap image. This test may be carried out even on a black and white bitmap image.

Other embodiments of the invention are now discussed. One or more of these embodiments may be combined with the process of FIG. 4.

One may add silhouettes to edges, like silhouettes 6 and 8 of FIG. 1. These are not edges or lines in the tessellated representation of the modelled object, since their position depends on the selected view. Still, these silhouettes may be handled as edges for searching the hidden parts. Thus, step 20 of providing a tessellated representation of the object may comprise computation of silhouettes. The word "edges" in the description of the various embodiments may thus encompass not only actual edges of the modelled object, but also silhouettes.

In another embodiment, the edges are signed; in other words, means are provided for differentiating edges in the bitmap image. Signing edges first makes it possible to distinguish between overlapping edges in the drawings; in the example of FIG. 2, lines 18 and 10 would overlap in a front view of the modelled object. Signing edges makes it possible, when running steps 28-36 for line 18, to determine that the pixels in the bitmap image of the front view represent line 18 and not the underlying line 10. When running steps 28-36, it is ascertained that the line is fully hidden, even though there are some pixels in the bitmap image of the front view that correspond to the raster of line. Thus, line 18 is drawn in the vector image, but not line 10. The vector image is more accurate and superimposed lines are not drawn. Another example is the intersection between lines. In FIG. 2, line 10 intersects line 6 and line 8. The intersection point is actually a point of lines 6—respectively line 8—since lines 6 and 8 are in front of line 10. Signing edges make it possible to determine that the intersection point should be drawn in line 6 or 8 but not in line 10.

In addition, signing edges may fasten the process. If edges are signed, one may provide a table of signatures present in the bitmap image. When considering an edge of the modelled object, comparison steps need not be carried out if the signature of the edge is not present at all in the bitmap image. This makes it possible to avoid scanning lines which do not appear at all in the bitmap image. In the process of FIG. 4, one could add a test step before step 26 of rastering the edge; in this step, it is determined whether the signature of the selected edge appears at all in the bitmap image. If the signature does not appear, the process would jump directly to step 36. Else, steps 26 and following could be carried out as discussed in reference to FIG. 4.

There are several solutions for signing edges. One solution consists in attributing colours to the various edges. These may be colours already granted to edges in the modelled object or its representation. One may also affect different colours to the edges; this solution is particularly advantageous in that it makes it possible to affect different colours to all edges in the tessellated representation of the modelled object—provided the number of edges is lower than the number of colours available in the graphic card. The number of colours is often higher than two millions, so that colours provide an efficient signature. This signature also has the advantage that colours are handled in most design systems and graphic cards, so that there is no need to provide additional tools for signature. One may in this case disable functions of the graphic cards, such as anti-aliasing, which may change affected colours.

Another solution consists in using indices provided in some graphic cards. These cards allow objects to be indexed. The index is thus a solution for signing the edges.

Still another solution consists in using depth information. As discussed above, depth is provided in some graphic cards are a by-product of the process. One may, at the time a raster is provided for a given edge, compute depth of the various pixels in the raster. Comparison of depth makes it possible to distinguish between superimposed edges. In the example of a front view of the object of FIG. 1, lines 18 and 10 are superimposed, but line 18 is in front of line 10. Thus, when a pixel of the raster of line 10 is considered, the comparison step 30 shows that there exists a corresponding pixel in the bitmap image. However, this pixel of the bitmap image (which actually represents part of line 18) is not at the same depth as the pixel of the raster of line 10. This example of use of depth as a signature shows that even if the signature of each edge is not unique, signing edges may be advantageous.

In the examples provided above, the signature of each edge or line is a single parameter. A signature could be formed of a set of parameters. For instance, one could use as a signature a pair (c, d) formed of the colour c and of the depth d. If the colour and the depth are not unique for each edge, the compound signature (c, d) is more likely to differ from one edge to the other. For discriminating edges, one may also use position information. The view is separated in various parts—e.g. four identical parts. This provides a parameter representative of the position of the edges, having four values in the example of four parts. This parameter may be used in the process of FIG. 4 for identifying edges, or rather discriminating between edges.

Thus, signing edges may fasten the process and/or improve the accuracy of the resulting vector image, e.g. where lines or edges superimpose in the view.

The process of FIG. 4 may be made more accurate as regards intersections of lines. First, as discussed above in reference to lines 6, 8 and 10, signing edges make it possible to determine to which edge belongs an intersection point. In addition, if facets of the tessellated representation are signed, one may determine the edge or facet which hides a given line. For instance, in the example of FIG. 2, line 10 is partially hidden by the surface of cylinder 4. If facets of this surface are signed, one may find the first facet in the tessellated representation which hides line 10, when proceeding along line 10 in the comparison steps 30-36. Assume for instance facets and edges are colour-signed. When proceeding along edge 10, from the left end of this edge in FIG. 2, one first finds in the bitmap image pixels having the colour of edge 10. The first pixel for which the colour is not the colour of edge 10 provides a signature of the silhouette of the cylinder face which hides line 10. This silhouette being identified, the end of the visible part of edge 10 may be determined by computing the intersection of line 10 with the identified silhouette. The computed intersection is of course the intersection of the projections on the figure. One understands that the end of a visible part of a line may thus be determined with an accuracy which is not limited by the pixel size: the bitmap image is only used for determining which edge or facet of the tessellated representation hides a given part of the selected edge. The intersection with this hiding facet is used for the purpose of computing the intersection. This is represented at an enlarged scale in FIG. 5. The figure shows schematically edge 10 and face 50 of the cylinder 4. Face 50 is formed of various facets, which are drawn in various colours. Facet 52 is the first facet hiding line 10; in the process of FIG. 4, assuming line 10 is scanned from left to right, the first time the processes passes in step 32, the hiding pixel has the colour of facet 52.

Figure 5:
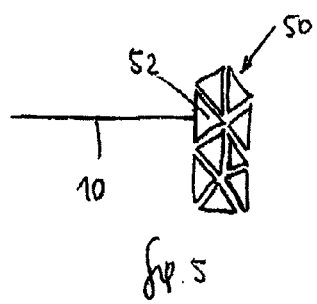
FIG. 5 is an enlarged view of a bitmap image of the object of FIG. 2.

One may also determine the end of visible lines or edges with a higher accuracy; first, the hiding facet is determined as explained in reference to FIG. 5. Then, one finds the face related to this facet. One may then compute the intersection of the edge with this face. In the example of FIGS. 2 and 5, facet 52 is hiding line 10. Facet 52 is part of the face of cylinder 4; this means that the last visible point on edge 10 is the intersection of this edge with the silhouette of the cylinder. The accuracy with which the end of the visible part is determined does not depend on the tessellated representation. In the example of FIGS. 2 and 5, line 10 is a straight line, so that there may not be any difference between line 10 and the corresponding edge. In case of a complex line L approximated by a series of edges $E_l$-$E_m$, one may determine that edge $E_k$ of line L is hidden by facet $F_j$ and compute the intersection point of line L with facet $F_j$ or the intersection of line L with a face S which is represented by facet $F_j$.

In these embodiments of the invention, the accuracy with which the ends of visible parts of lines is determined does not depend on the pixel resolution, even though the existence of an intersection may depend on pixel resolution; if the intersections are computed using surfaces, the accuracy does not depend on the tessellated representation of the modelled object. Thus, one may provide a vector image as accurate as needed. It is important to note that the accuracy of the vector image with hidden lines may vary over the image. One may vary the accuracy according to the areas of the image, by selecting the pixel size in the bitmap image;

selecting the pixel size in the raster of a line;

computing the intersection of an edge or a line with a facet or computing the intersection of an edge or a line with the underlying face.

All methods may be used in the same vector image, successively or for various areas of the image. If the methods are used successively, the process may provide rapidly a coarse vector image and then improve the accuracy of the image. One may for instance zoom part of the image and use a more accurate computation of the vector image in the zoomed part of the image. The use of a solution ensuring a given accuracy may depend on the zooming factor; thus, one could provide a coarse vector image for original screen display, and provide an image with a better accuracy for the parts of the image zoomed by the user. If the methods are used in the same image, one may change the accuracy over the image. There is no need to re-compute the full image for improving the accuracy in a selected area. One may separate the image in various parts and change the resolution or accuracy in the various parts. This is especially of interest if the area of interest for the end user is predetermined.

The invention may be implemented using programming tools and solutions known to the person skilled in the art. One may for instance use C++ as a programming language, in a CATIA V5architecture; any graphic card available on the market, such as the ones sold under the trademarks ATI or NVIDIA. A program implementing the invention receives the bitmap image—for instance obtained from a graphic card—and the representation of the modelled object. Based on the bitmap image, the program scans the lines of the modelled object, as discussed above in reference to FIG. 4.

Figure 6:
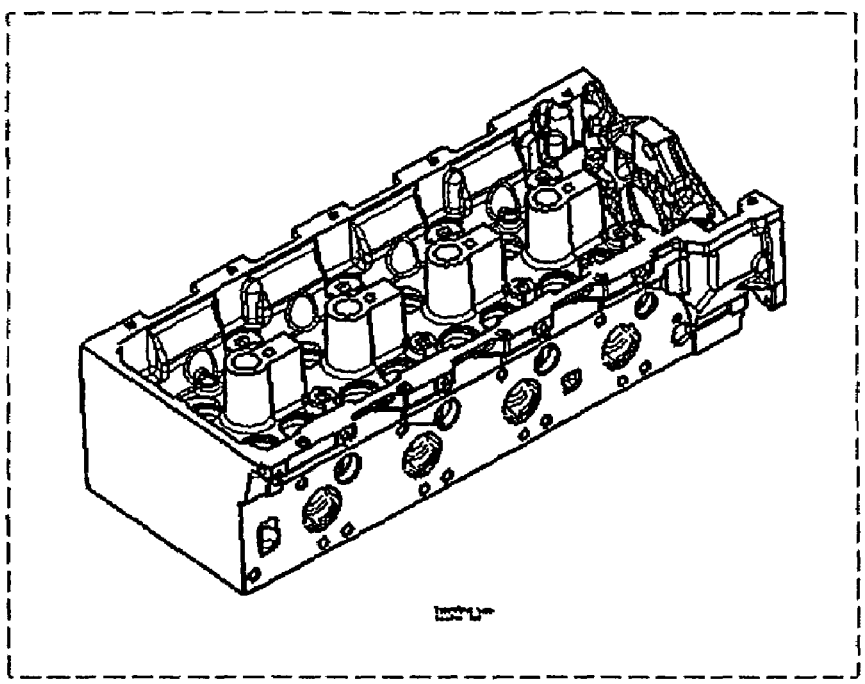
FIGS. 6-12 are views of modelled objects obtained with a prior art solution and with the process of the invention.

FIGS. 6-12 are views of modelled objects obtained with prior art solutions and with the process of the invention. FIG. 6 is a vector image of a complex designed object, with removed hidden lines, obtained with the prior art solution implemented in CATIA. The vector image of FIG. 6 is obtained in 27 s, when the CATIA V5 design system is operated under the Microsoft Windows 2000 (trademark) operating system on a computer with an Intel Pentium IV (trademark) processor running at 2.8 GHz, a Random Access Memory of 1Go and a graphic card sold under the trademark NVIDIA Quadro2. This configuration is an example and the process of the invention may be achieved on any other configuration.

Figure 7:
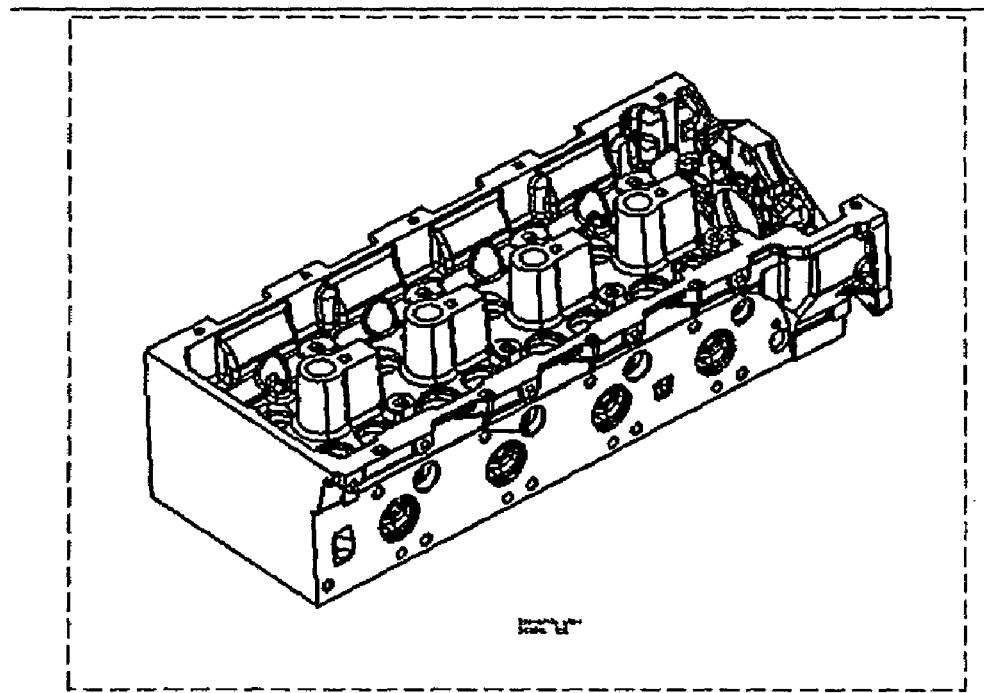

FIG. 7 is a vector image obtained according to the invention; this image is obtained in 11 s. The quality of the image is almost similar to the quality of the prior art image.

Figure 8:
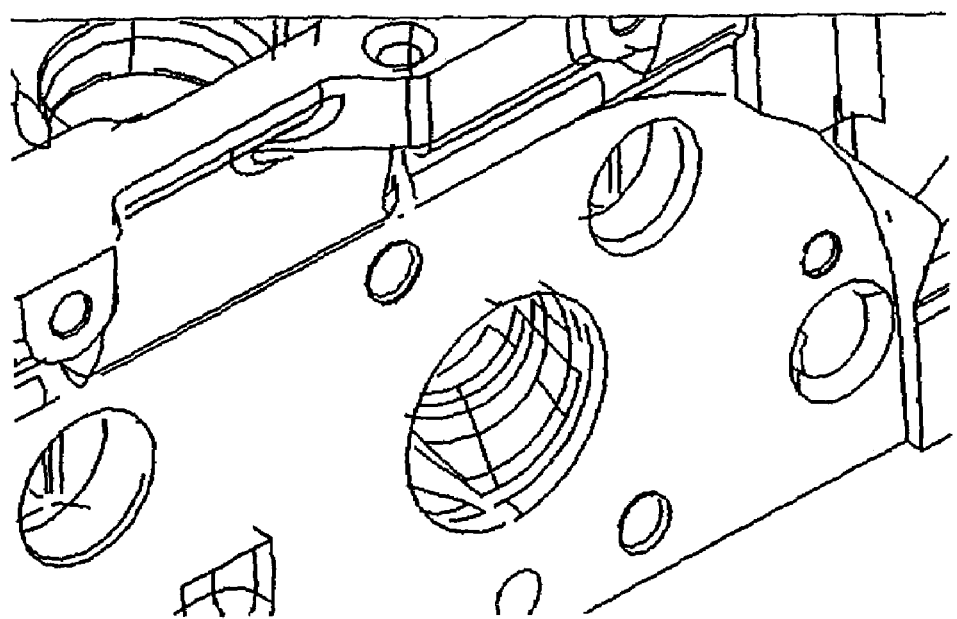
Figure 9:
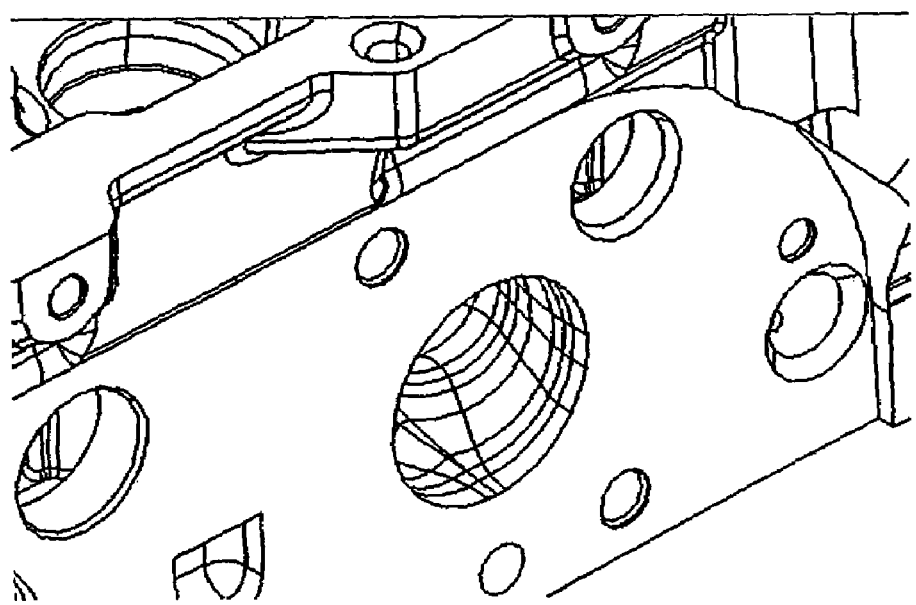
Figure 10:
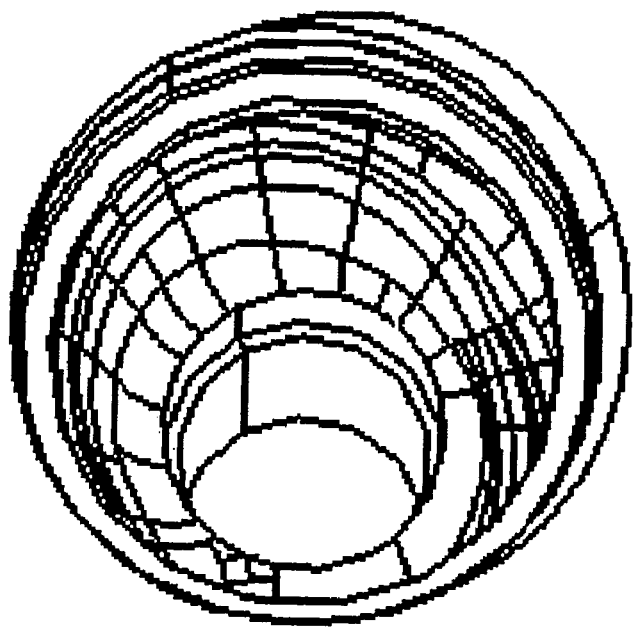
Figure 11:
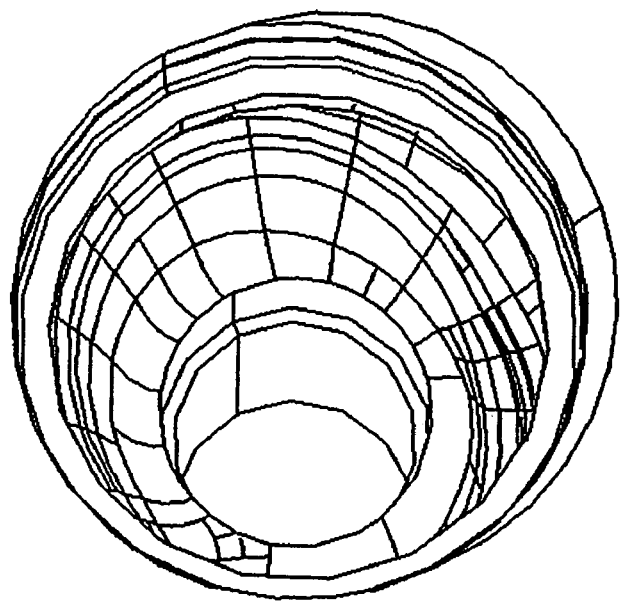
Figure 12:
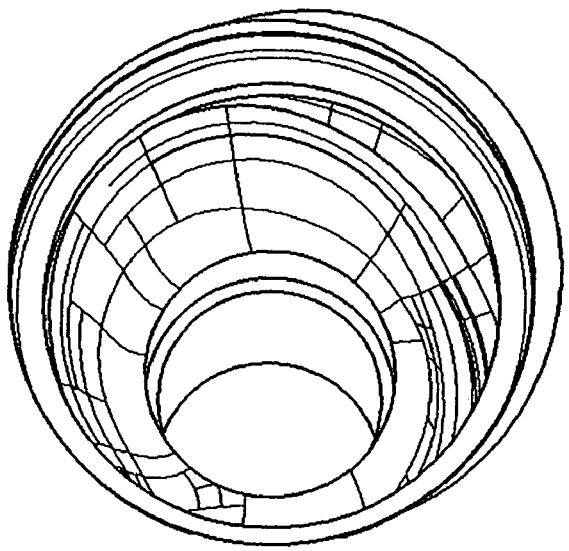

FIGS. 8 and 9 are enlarged views of the same modelled object. The image of FIG. 8 is a low quality image obtained in 3 s; the image of FIG. 9 is an enlarged view of FIG. 7 obtained by zooming on the said FIG. 7 for better understanding. FIGS. 10-12 exemplify the quality differences between the various images of an object. FIG. 10 is a raster image of the object. FIG. 11 is an image obtained using the process of FIG. 4. FIG. 12 is obtained thanks to a prior art solution. The comparison between these figures shows that the invention makes it possible to obtain a quality of image similar to the one of the prior art, more rapidly and with less need for resources. The invention is not limited to the examples provided in the detailed description. In the examples, a tessellated representation of the object is used. This is advantageous in that the tessellated representation may immediately be input to a graphic card. One may use any other types of representation of the modelled object, such as NURBS, subdivisions surfaces, or the like. These representations also include lines, in the broad meaning of this word. The various embodiments of the invention may be used in combination, even within the same image.

The invention claimed is:

1. A computer-implemented process for providing a vector image of a view of a modelled object with removed hidden lines, comprising the steps of
   providing a representation of the modelled object with hidden lines included;
   providing a bitmap image of the view of the modelled object, with removed hidden lines;
   for a line of the vector image,
      providing a raster of the line in the view,
      comparing pixels of the raster with pixels of the bitmap image and
      according to the results of the comparison, determining a visible part of the line,
   providing a vector image of a view of the modelled object with removed hidden lines, the step of providing a bitmap image further comprising signing pixels in the bitmap image, wherein different lines are provided with different signatures and for a line having a given signature, the process further comprising the steps of:
   searching if the bitmap image comprises pixels having the given signature, and
   if the bitmap image does not comprise pixels having the given signature, determining that the line is not visible in the vector image.

2. The process of claim 1, wherein the step of providing a bitmap image comprises computing a bitmap image in hardware logic.

3. The process of claim 2, wherein the step of providing a bitmap image comprises computing a bitmap image in a graphic card.

4. The process of claim 1, wherein the modelled object is provided in a tessellated representation with edges and faces, and wherein the lines comprise edges of the tessellated representation.

5. The process of claim 4, wherein the lines further comprise silhouette.

6. The process of claim 1, wherein the step of comparing comprises comparing a signature of the line with a signature of pixels of the bitmap image.

7. The process of claim 1, wherein the lines of the modelled object are colour-signed.

8. The process of claim 1, wherein the modelled object is provided in a tessellated representation with edges and facets and wherein the step of determining comprises:
   finding a facet hiding a line, and
   computing the intersection of the facet with the line.

9. The process of claim 1, wherein the modelled object is provided in a tessellated representation with edges and facets and wherein the step of determining comprises:
   finding a facet hiding a line, and
   computing the intersection of the line with a face related to the facet.

10. A data storage medium comprising storage instructions for providing a vector image of a view of a modelled object with removed hidden lines, comprising:
   a routine for receiving a tessellated representation of the modelled object with hidden lines included, including edges and facets, wherein the modelled object comprises signed lines;
   a routine for receiving a bitmap image of the view of the modelled object, with removed hidden lines, wherein the bitmap image comprises signed pixels;
   a routine for providing a raster of a line of the modelled object in the view;
   a routine for comparing pixels of the raster of a line with pixels of the bitmap image;
   a routine for determining, according to the results provided by the comparing routine, a visible part of the line; and
   a routine for searching whether the bitmap image comprises pixels having the signature of a line of the modelled object.

11. The data storage medium of claim 10, wherein the instructions are adapted to receive a modelled object with colour-signed lines and a bitmap image with colour-signed pixels.

12. The data storage medium of claim 10, wherein the instructions are adapted to receive a modelled object in a tessellated representation with edges and facets and wherein the determining routine is adapted to
    find a facet hiding a line, and
    compute the intersection of the facet with the line.

13. The data storage medium of claims 10, wherein the instructions are adapted to receive a modelled object in a tessellated representation with edges and facets and wherein determining routine is adapted to
    find a facet hiding a line, and
    compute the intersection of the line with a face represented by the facet.

* * * * *